United States Patent [19]

Sugiyama

[11] Patent Number: 5,043,595

[45] Date of Patent: Aug. 27, 1991

[54] POWER SUPPLY CONTROL SUBSYSTEM FOR AN IMAGE FORMING APPARATUS

[75] Inventor: Tsukasa Sugiyama, Osaka, Japan

[73] Assignee: Mita Industrial Co., Ltd., Osaka, Japan

[21] Appl. No.: 575,413

[22] Filed: Aug. 30, 1990

[30] Foreign Application Priority Data

Aug. 31, 1989 [JP] Japan .................................. 1-226509

[51] Int. Cl.⁵ ......................... H02J 1/00; G03B 25/00
[52] U.S. Cl. ..................................... 307/39; 307/155; 355/315
[58] Field of Search ...................... 307/38, 39, 41, 155; 355/204, 208, 308, 315

[56] References Cited

U.S. PATENT DOCUMENTS 3,944,359  3/1976  Fisk et al. ............................ 355/204
4,890,212  12/1989  Kumon et al. ......................... 307/38

Primary Examiner—Peter S. Wong
Assistant Examiner—Ben M. Davidson
Attorney, Agent, or Firm—Cushman, Darby & Cushman

[57] ABSTRACT

A power supply control subsystem for an image forming apparatus is provided to control the operating timing of multiple DC loads according to selected image forming modes. Electric power is supplied from a single DC power source to a plurality of DC loads through corresponding switching devices inserted therebetween. A control circuit staggers the on-timings of the switching devices so that electric power is supplied to the DC loads in a sequentially, predetermined priority order according to a selected image forming mode.

1 Claim, 4 Drawing Sheets

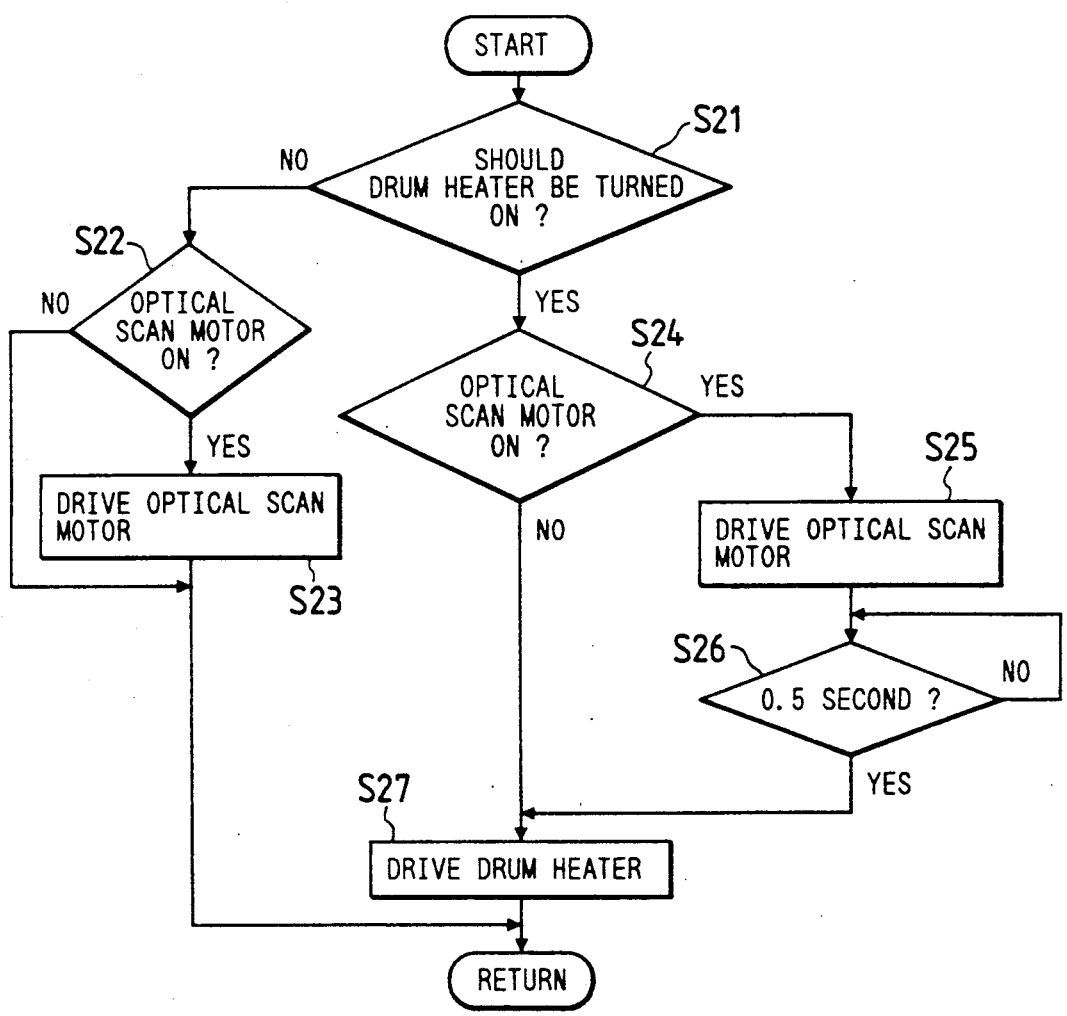

POWER SUPPLY CONTROL SUBSYSTEM FOR AN IMAGE FORMING APPARATUS

BACKGROUND OF THE INVENTION

1. Field of the Invention

The present invention relates to an image forming apparatus, and more particularly, to an image forming apparatus having multiple DC loads which are effectively supplied with electric power from a single DC power supply.

2. Background and Related Art

Japanese Patent Unexamined Publication No. 63-95465 describes a conventional load power controller for a copying machine. The copying machine has two large power consuming AC loads: an exposure lamp and a fuser heater. Coordinating the operation of the exposure lamp and the fuser heater is important for consistent AC power distribution. For example, when the exposure lamp is lighting up, the AC power supply voltage varies depending upon whether the fuser heater is turned on or off. As a result of the voltage variation, the amount of light emitted from the exposure lamp varies, often causing copy irregularities (or density irregularities).

To avoid problems such as copy irregularities, the conventional load power controller provides staggered on-timings for the exposure lamp and the fuser heater so that these AC loads are not activated simultaneously. Accordingly, variations in the AC power supply voltage is minimized, thereby effectively eliminating the light amount variations of the exposure lamp (specifically, a density irregularities in copy images).

More recent copying machines contain many DC motors for driving certain components in the machine. For example, a copying machine may contain a paper feed motor, a drum motor, a transfer motor, a cleaning motor, a fuser motor, and a paper refeed motor for feeding paper from an intermediate tray. The copying machine may also contain a DC heater for heating a photosensitive drum.

A single DC power supply is generally used to provide DC power to the DC loads. The conventional load power controller for the AC loads described above has been proposed to control the DC power supplied to the multiple DC motors. Under this proposal, however, no consideration is given to the DC loads because the DC power supply, unlike the AC power supply, is free from voltage variation. When one of the DC loads is greatly increased, a safety circuit of the DC power supply restricts the output current therefrom, giving rise to a problem. With the current restricted, the DC motor requires more time to start up. No technical measure has been taken for such a problem.

Therefore, when multiple DC loads employed in conventional copying machines are employed, the current restriction from the DC power supply may result in unstable operation and delay in start up timings of the DC loads. Such a condition should be removed.

Accordingly, the present invention has a chief object to provide a power supply control device for controlling the power supplied to multiple DC loads from a single DC power supply.

Another conventional copying machine includes multiple drive devices, for driving corresponding DC motors, which are selectively driven according to a selected copy mode. However, in this copying machine, the order in which the drive devices are turned on according to copy modes has not been optimized for maximum operational efficiency. When switching from one copy mode to another, the first copy is remarkably slow due to the inefficient order of activating the drive devices. Thus, copying efficiency is impaired.

Accordingly, another object of the present invention is to provide a power supply control device for controlling the start-up timings of the DC motors in an efficient operating order according to copy modes.

SUMMARY OF THE INVENTION

Accordingly, the present invention provides an image forming apparatus having multiple image forming modes. Electric power is supplied from a single DC power source to a plurality of DC loads through corresponding switching devices inserted therebetween. A control circuit staggers the on-timings of the switching devices so that electric power is supplied to the DC loads in a sequentially, predetermined priority order according to a selected image forming mode.

When a DC motor starts up, a relatively large surge current flows. According to the present invention, the control circuit staggers the on-timings of the switching devices to prevent concurrent supply of power to the DC motors. After a first DC motor is started and the surge current therein subsides, power to the next DC motor is supplied. Hence, a simultaneous flow of surge currents into multiple DC motors is prevented.

The DC motors are selectively driven in a predetermined priority order according to selected copy modes. By utilizing this feature, the drive motors necessary for paper feed (i.e., a paper feed unit motor for the obverse side copy, and a paper refeed motor for the reverse side copy) are first driven to start the paper feed. Then, the photosensitive drum motor and the developing motor are driven in successive order. In this manner, the paper feed starts simultaneously with the start of the copying operation. Accordingly, operating efficiency is improved since the speed of the first copy-following a copy mode change is increased due to the efficient order of activating the drive devices.

BRIEF DESCRIPTION OF THE DRAWINGS

These and other advantages will become more apparent from the detailed description of the preferred embodiment, as illustrated by the following drawings:

FIG. 2 shows a flowchart of the operation of a copying processing operation of the power supply control device according to the present invention;

DESCRIPTION OF THE PREFERRED EMBODIMENT

A preferred embodiment of the present invention will be described in detail with reference to the accompanying figures.

Figure 3A:
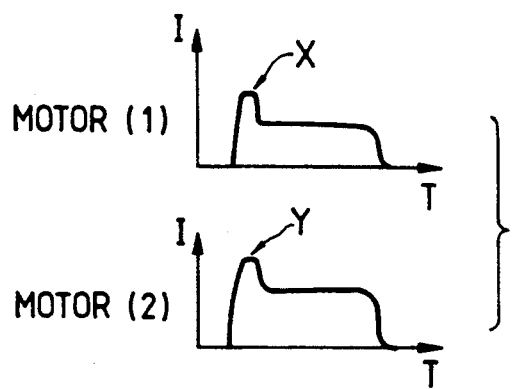
FIGS. 3(A) through 3(D) provide graphs illustrating surge current characteristics in DC motors and current restrictions of a DC power source.
Figure 3B:
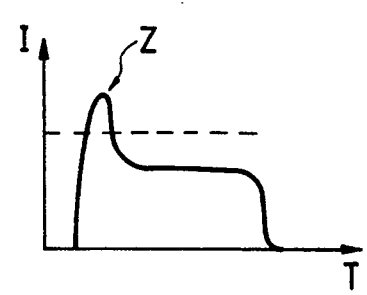
Figure 3C:
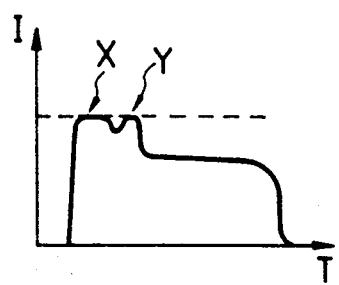
Figure 3D:
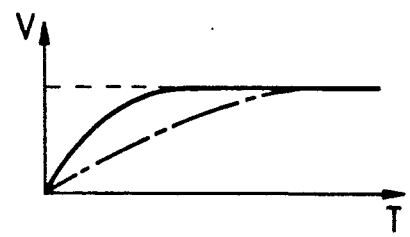

FIGS. 3(A)-3(D) graphically illustrate the relationship between an initial surge current of a DC motor and a DC power source, wherein the abscissas represent time, and the ordinates represent either current (FIGS. 3(A)-3(C)) or voltage (FIG. 3(D)). To start up a DC motor, a large drive force is required initially, resulting in a surge current. As shown in FIG. 3(A), a surge current occurs in each DC motor (1) and (2) before steady state current flow is achieved, thereby giving rise to the initial current spikes X and Y, respectively, followed by the flat constant current regions. Accordingly, when two DC motors (1) and (2) simultaneously start up as shown in FIG. 3(B), a considerably large surge current Z is required initially.

DC power sources are generally provided with safety circuits. When a current from a DC power source exceeds a fixed value, the safety circuit restricts the current. Thus, a surge current shown in FIG. 3(B) is not normally permitted to flow, but is restricted to a fixed value illustrated by the dashed line. Under this safety circuit restriction, a simultaneous start-up of both DC motors (1) and (2) cannot occur because the large surge current necessary to start up both DC motors is not permitted to flow. Instead, during simultaneous start-up, surge currents are spread over time to start up the DC motors successively as indicated by the two current spikes X and Y in FIG. 3(C). Therefore, when starting up, the operating voltage of each DC motor rises slowly as indicated by a one-dot-chain line in FIG. 3(D), thereby retarding the desired start-up time.

Furthermore, due to this flow restricted condition, the order in which the two DC motors (1) and (2) start up varies. Thus, the DC motors are operated in an unstable state. The instant embodiment is directed to solve such a disadvantage.

Figure 4:
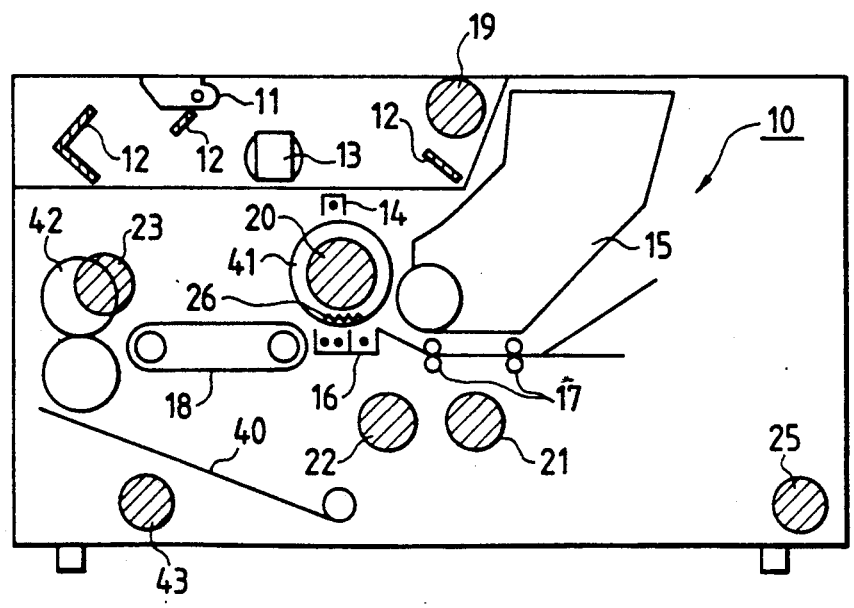
FIG. 4 shows a schematic of the innards of a copying machine, which is provided with a power supply control device according to an embodiment of the present invention.

FIG. 4 shows a copying machine 10 having an optical system which includes an illumination lamp 11, a plurality of reflecting mirrors 12, and a condensing lens 13. The copying machine 10 further includes an image forming system comprising a photosensitive drum 41, a drum heater 26, a charger 14, a developing unit 15, a transfer/separation charger 16, and the like. Also included in the copying machine 10 is a transfer roller 17, a transfer belt 18, and a fixing unit or fuser 42.

Corresponding DC motors are provided for the components discussed above. An optical scan motor 19 is provided to drive the illumination lamp 11, and the like, in a scanning pattern. A drum motor 20 is provided to rotate the photosensitive drum 41. A developing motor 21 drives agitating and developing sleeves in the developing unit 15. A transfer motor 22 drives a paper transfer unit. A fuser motor 23 drives a roller in the fuser 42. A paper-feed unit motor 25 feeds paper, which is not yet copied, to the paper transfer unit. A paper refeed motor 43 feeds paper, having one side copied, from an intermediate tray 40 to the paper feed unit.

Figure 5:
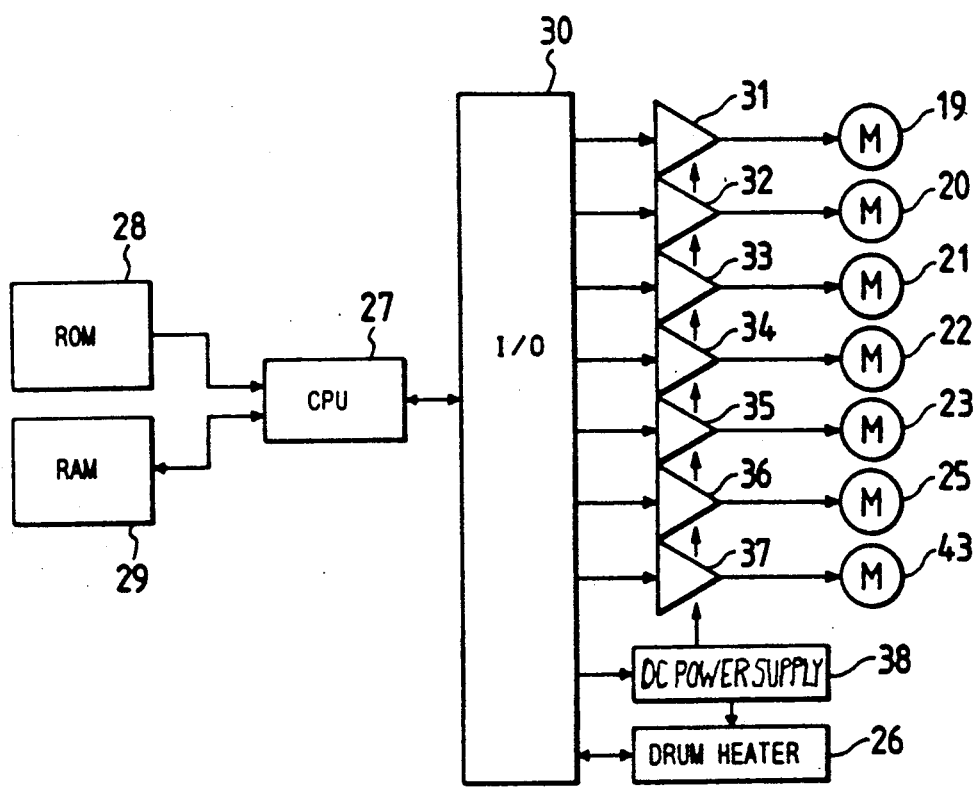
FIG. 5 is a block diagram showing an arrangement of the power supply control device contained in the copying machine of the present invention.

FIG. 5 is a block diagram showing an arrangement of the power supply control device contained in the copying machine 10. The control circuit comprises a CPU 27, a ROM 28 and a RAM 29. The ROM 28 stores operating programs employed by the CPU 27, and the RAM 29 provides data read/write capabilities. The CPU 27 is coupled to motor drivers 31-37 via an input/output (I/O) interface 0. The motor drivers 31-37 respectively drive the optical scan motor 19, the drum motor 20, the developing motor 21, the transfer motor 22, the fusing motor 23, the paper-feed unit motor 25, and the paper refeed motor 43.

The drum heater 26 is coupled to the I/O interface 30 and contains a switching circuit. A DC power supply 38 is coupled to the I/O interface 30 and supplies a drive electric power to the motor drivers 31-37 and the drum heater 26.

The operation of the power supply control device shown in FIG. 5 will be described with reference to FIG. 1.

At step S1, the power supply control device checks to see if an input has been entered to a keyboard (not shown) installed in the copying machine 10. When an input is detected, an input processing is executed at step S2. At step S3, the CPU 27 determines whether a print key instructing the copying machine 10 to begin operation is turned on. If the print key is not turned on, control is returned to the initial input checking step S1.

However, if the print key is turned on, the CPU 27 determines at step S4 if the paper was fed from the intermediate tray 40. If the paper was not fed from the intermediate tray 40 (indicating copy of the obverse side), the CPU 27 instructs motor driver 36 via the I/O interface 30 to start-up the paper feed unit motor 25 at step S5. On the other hand, if the paper was fed from the intermediate tray 40 (indicating copy of the reverse side), the motor driver 37 is instructed to drive the paper refeed motor 43 at step S6.

The control operation is then delayed for 0.3 seconds at step S7. After the 0.3 seconds delay, the motor driver 32 drives the drum motor 20 at step S8. Operation is then paused for another 0.3 seconds at step S9. Afterwards, the CPU 27 controls the motor driver 33 to drive the developing motor 21 at step S10. After a stabilizing processing operation is applied to the photosensitive drum 41 at step S11 (e.g., removal of residual potential), the motor driver 34 drives the transfer motor 22 at step S12.

The control operation is then paused for 0.3 seconds at step S13. After this pause, the fusing motor 23 is driven at step S14. Following another 0.3 second delay incurred at step S15, the CPU 27 determines at step S16 whether the copied paper is destined for the intermediate tray 40. If the destination is the intermediate tray 40, the CPU 27 instructs the motor driver 37 to drive the paper refeed motor 43 at step S18. The CPU 27 then executes a copy processing operation at step S19.

According to the above described operation, the DC motors in the copying machine 10 are driven in accordance with copy modes. In this manner, the DC motors are successively operated in the most efficient order for that particular copy mode, thereby reducing the first copy delay experienced in conventional copying machines.

The CPU 27, operatively coupled through the I/O interface 30 to the motor drivers 31-37, staggers the start-up timings of the DC motors at preset time intervals of, for example, 0.3 seconds. This preset time interval is slightly longer than the duration of the surge current during the start-up of a DC motor. Thus, the surge current resulting from the start-up of one DC motor is ended prior to the start-up of the next DC motor. Accordingly, the surge currents resulting from the start-up of each successive DC motor do not occur concurrently. Thus, the power supply control device of the present invention can stably drive multiple DC loads without any restriction of the current fed from a DC power source.

Figure 1:
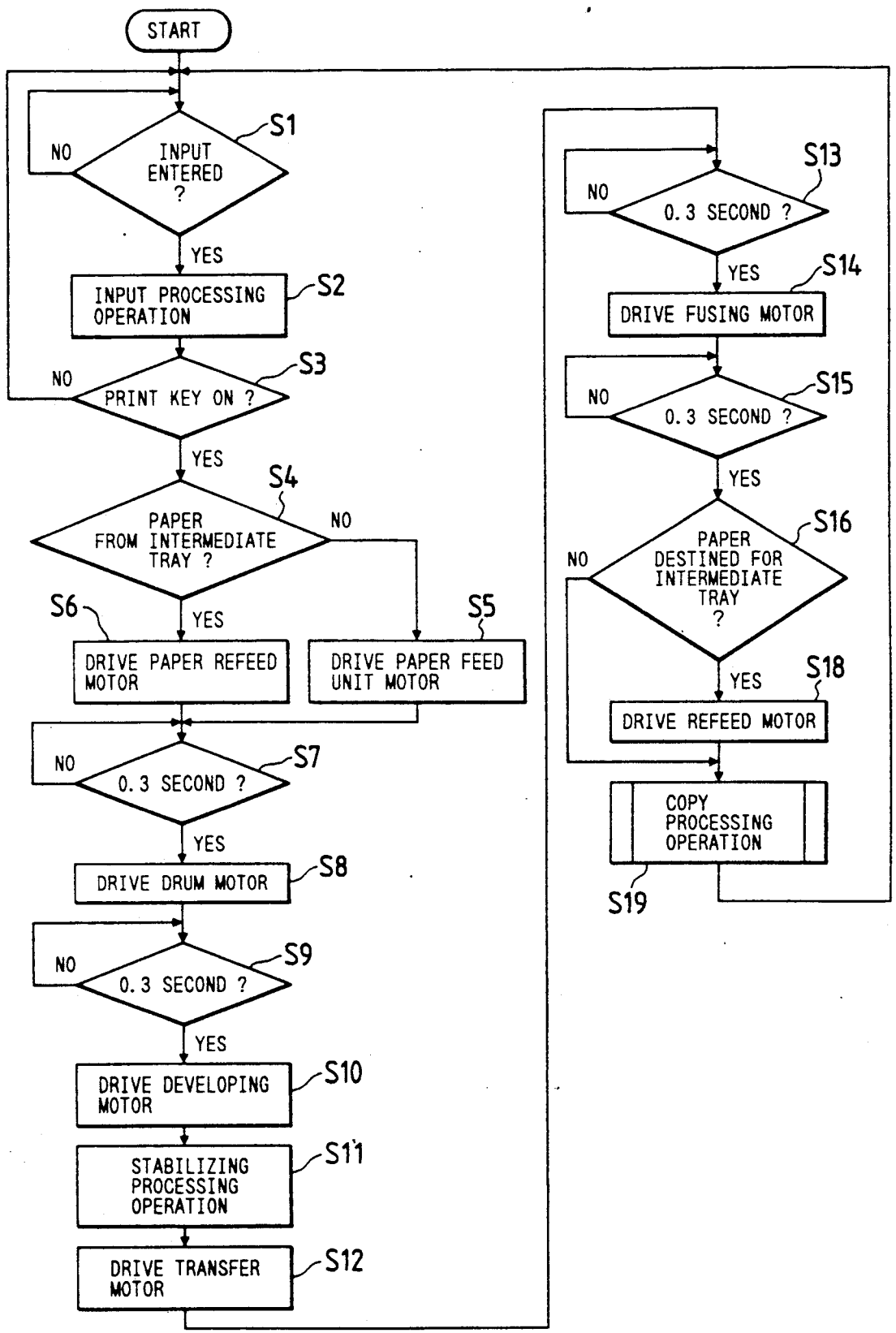
FIG. 1 shows a flowchart of the operation of a power supply control device for a copying machine according to the present invention.

In step S19 of the control operation illustrated in FIG. 1, the copy processing operation is executed. During this operation, the optical scan motor 19 and the drum heater 26 are employed. The CPU 27 controls the start up timings of the optical scan motor 19 and the drum heater 26.

A specific control operation for the copy processing operation is shown FIG. 2. The CPU 27 determines at step S21 whether the drum heater 26 should be turned on. If the drum heater 26 should not be turned on, the CPU 27 determines whether the optical scan motor 19 should be driven at step S22. If the optical scan motor 19 should be driven, the CPU 27 instructs the motor driver 31 at step S23 to drive the optical scan motor 19.

On the other hand, if at step S21 the CPU 27 determines that the drum heater 26 should be turned on, the CPU 27 then determines whether the optical scan motor 19 should be driven at step S24. If the answer is YES, the optical scan motor 19 is driven at step S25. Control operation is then paused at step S26 a preset time, for example, 0.5 seconds. After the 0.5 second delay, the CPU 27 turns on the drum heater 26 at step S27. Accordingly, the DC power supply supplies electric power first to the optical scan motor 19, and then to the drum heater 26.

The present time delay in step S26 is set to be slightly longer than the time duration of surge current resulting from the start-up of the optical scan motor 19. This delay does not create any problem in reading an original. Moreover, since the optical scan motor 19 is driven prior to heating the drum heater 26, the optical scan motor 19 may begin turning without any delay. Thus, the copying speed is never diminished.

Although the power supply control apparatus according to the present invention has been described in the preferred embodiment of the copying machine 10, the power supply control apparatus may be employed in any apparatus having multiple DC loads supplied with electric power from a single DC power source, such as a facsimile, a printer, or the like.

It is to be understood that the invention is not limited to the disclosed embodiment, but is intended to cover various modifications and equivalent arrangements included within the spirit and scope of the appended claims.

What is claimed is:

1. A method for operating a power supply control subsystem for an image forming apparatus having a plurality of image forming modes and including a single DC power supply coupled to a plurality of DC motors via a corresponding plurality of switches, said DC motors including an optical scan motor, a drum motor, a developing motor, a transfer motor, a fusing motor, a paper feed unit motor, a paper refeed motor, said image forming apparatus further including control means for controlling said plurality of switches to selectively couple said DC power supply to each of said plurality of DC loads in a time-staggered, predetermined priority order in accordance with a selected one of said image forming modes, said image forming apparatus further including an intermediate paper tray, comprising the steps of:
   determining whether paper was fed from the intermediate paper tray;
   coupling DC power from said DC power supply to one of said paper feed motor and said paper refeed motor depending upon said determination;
   delaying for a predetermined time period;
   coupling said DC power to said drum motor;
   delaying for said predetermined time period;
   coupling said DC power to said developing motor;
   coupling said DC power to said transfer motor;
   delaying for said predetermined time period;
   coupling said DC power to said fusing motor;
   delaying for said predetermined time period;
   determining whether paper is destined for the intermediate paper tray; and
   coupling said DC power to said paper refeed motor if the paper is destined for the intermediate paper tray.

* * * * *